J. L. KOERBER.
COMBINED BATTERY RECEPTACLE AND BELL SUPPORT.
APPLICATION FILED JAN. 5, 1909.

962,033.

Patented June 21, 1910.

WITNESSES:
Ernest C. Guy.
La Vera Miller.

INVENTOR
James L. Koerber.
BY
Edward V. Hardway,
ATTORNEY

ANDREW B. GRAHAM CO., PHOTO-LITHOGRAPHERS, WASHINGTON, D.C.

UNITED STATES PATENT OFFICE.

JAMES L. KOERBER, OF HOUSTON, TEXAS.

COMBINED BATTERY-RECEPTACLE AND BELL-SUPPORT.

962,033. Specification of Letters Patent. Patented June 21, 1910.

Application filed January 5, 1909. Serial No. 470,856.

*To all whom it may concern:*

Be it known that I, JAMES L. KOERBER, a citizen of the United States, residing at Houston, in the county of Harris and State of Texas, have invented certain new and useful Improvements in a Combined Battery-Receptacle and Bell-Support, of which the following is a specification.

My invention relates to new and useful improvements in combined battery receptacles and bell supports and more particularly to that class of battery receptacles and bell supports used in connection with door bells, alarms, etc.

The object of the invention is to provide a device of this character that will obviate the necessity of using wires in connecting the batteries to the receptacle.

Another object is to provide a casing for the batteries which will perform the dual purpose of housing the batteries and of providing a sounding board for the bell.

A still further object resides in the provision of means in conjunction with the walls of the casing which will act as a brace to hold the batteries in place and at the same time assist in completing the circuit.

Finally the object of the invention is to provide a device of the character described that will be strong, durable, efficient, compact, simple and comparatively inexpensive to produce and one in which the parts will not be liable to get out of working order.

With the above and other objects in view, the invention has relation to certain novel features of construction and operation, an example of which is given in this specification and illustrated in the accompanying drawings, wherein:—

Figure 1:
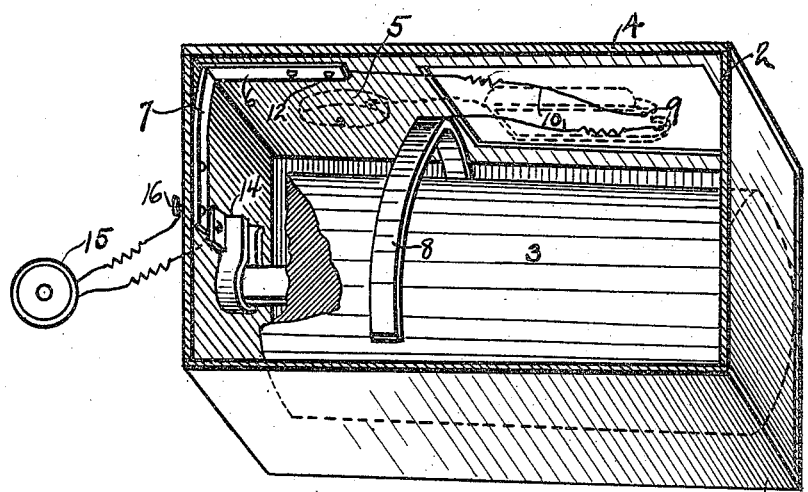
Figure 2:
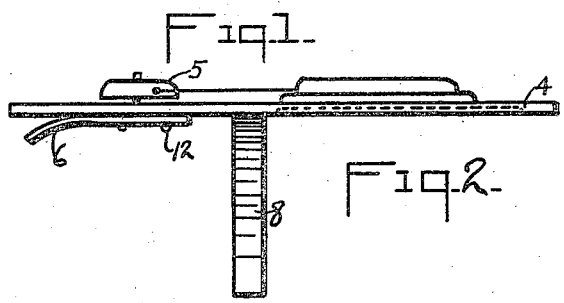
Figure 3:
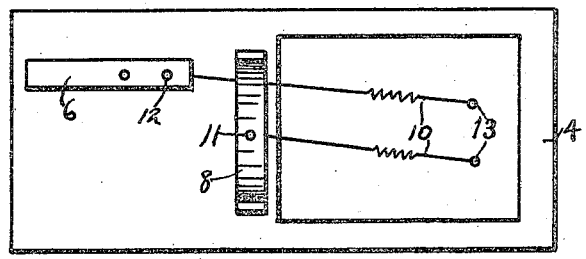
Figure 5:
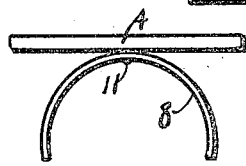
Figure 4:
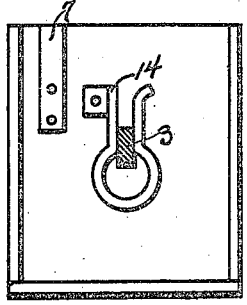

Figure 1 is a perspective view of the complete device lying on its side with the front wall and portion of the battery removed. Fig. 2 is an edge view of the sounding board with connections attached. Fig. 3 is a bottom plan view of the sounding board with connections attached. Fig. 4 is an elevation from the interior, of the connection end of the battery receptacle showing how the battery connects with the connection. Fig. 5 shows an edge view of the battery guard.

Referring now more particularly to the drawings in which like numerals of reference designate corresponding parts in all the figures, the numeral 1 refers to the base of receptacle or housing 2 for the battery 3.

The numeral 4 refers to the lid or sounding board to which a bell 5 is attached. This bell is provided with its own battery and clapper and may be of the ordinary type. The sounding board or lid is hollowed out, as shown in Fig. 2 by dotted line, so that when the bell is rung, a more resonant sound will be produced. On the under side of this lid an elastic brass tongue is secured by means of screws or nails and is designed to contact with brass tongue 7, of the same quality, properly located in the inner side of the connection end of the receptacle, when the lid 4 is placed in proper position on receptacle 2.

The numeral 8 refers to a semi-circular guard composed, preferably, of elastic brass secured to the sounding board and so disposed as to engage snugly about the battery 3 and to assist in completing the circuit from battery 3 to the binding posts 9, of the bell, through one of wires 10. These wires are secured to brass tongue 6 and guard 8 through screws 11 and 12, at one end, in the ordinary way, and pass through openings 13 of the sounding board 4 and are secured to binding posts 9, at their other ends.

It is to be observed that the openings 13 in the lid 4, are alined with the binding posts 9. One of the wires 10, passes from one binding post 9, through one of said openings and has connection with guard 8, and through said guard, the battery embraced thereby, and grip 14 with one of the binding posts 16. The other of the wires 10, connects with the other binding post 9, passes through the other opening 13, and has connection with the other binding post 16, through tongue 6, which has connection with said wire 10, and tongue 7, which contacts with tongue 6, and is connected with said binding post 1. The battery used is of the common dry cell type, which in common use is wrapped with heavy paper, but in this device is taken off, permitting the grip 14, to contact with the metal surface of said battery, thus a complete electrical connection is formed.

Special attention is called to grip-connection 14 shown in detail in Fig. 4. This connection is preferably U shaped and made of spring brass and is flared at the top so as to readily receive the carbon of the battery. This grip is preferably enlarged at the bottom, as shown, and is held in position on the wall of receptacle 2 by means of a bolt and nut; as is also tongue 7. These bolts and nuts also serve as binding posts 16 for the line wires leading to the circuit closer 15. The connection 14 also serves as a brace to assist in holding the battery in position.

It is obvious that a receptacle constructed in this way and having connection made in accordance with the foregoing description will be a very efficacious, compact and simple device.

The construction of my device is as follows:—The receptacle is constructed so that it will be slightly larger than the battery 3, stripped of paper wrappings. Brass tongue 7 and grip connection 14 are bolted to the interior of one end of the casing heretofore called the connection end, the connection 14 being centrally located on said end with respect to the sides; and the brass tongue 7 being bolted near one side of said end so that the upper end thereof will project into the plane of the upper edges of the casing 2. Brass tongue 6 is secured to the under surface of the lid near its end and at one side so that when the lid is fastened down 6 and 7 will contact. Tongues 6 and 7 are both slightly curved out from the walls of the receptacle so as to form a positive contact with each other. The guard 8 should be secured to the lid centrally with respect to its sides and near one end thereof, so that it will fit snugly over the battery and tend to hold the same in place. The battery is placed within the casing with the carbon lying in the groove of grip-connection 14 as shown in section in Fig. 4. Lid 4 should then be screwed to casing 2 so that tongues 6 and 7 will contact the guard 8, at the same time gripping the battery, whose carbon is also gripped by connection 14 so that an electrical connection is provided between the guard 8 and grip connection 14, through the said battery. A bell is located on the outside of the sounding board or lid and properly wired so as to have connection with the battery and other connections within the casing, as hereinbefore set forth.

A device of this character will also be an ornament instead of being unsightly, as is often the case when no casing is provided for the batteries, and will provide a perfectly dry compartment for the battery, thereby materially extending the life of the same, at the same time providing a sounding board for the bell, thereby giving the same a clearer and more resonant sound.

While I have shown this specific form of construction and described this method of operation I do not desire to limit myself to either of the exact forms of construction or the specific method of assembling the parts and forming the contacts.

What I claim is:—

1. In a combined battery, receptacle and bell support, the combination with a receptacle, of a tongue and grip carried thereon, a bell support carried by said receptacle and arranged to form a sounding board; a battery; a metallic guard carried by said bell-support and adapted to contact with and embrace said battery, a carbon carried by said battery and embraced by said grip, a metallic tongue also carried by the bell support and adapted to contact with the tongue carried by the receptacle when the said support is secured thereto, said battery being so disposed as to serve as an electrical connector between said guard and grip.

2. A device of the character described, composed of a receptacle, a metallic tongue connection secured to the wall thereof, a metallic grip connection also secured to said wall, a lid carried by said receptacle, said lid being concaved or hollowed out so as to form a sounding board, a bell carried by said lid, a metallic tongue carried by said lid positioned so as to contact with the metallic tongue carried by said wall; a battery a guard also carried by said lid adapted to closely embrace and contact with said battery carried within said receptacle, said battery being provided with a carbon which is embraced by the grip secured to the wall of the receptacle, and said battery also serving as an electrical connection between said guard and grip.

3. The combination with the bell of the class provided with a controlling mechanism, binding posts, and battery for operating the same; of a receptacle for the battery of a size to closely surround the same; a closely fitting lid for said receptacle; a metallic guard carried by said lid designed to embrace said battery and contact with the metallic wall thereof; a metallic tongue also carried by said lid; a metallic tongue also carried by the wall of said receptacle, said tongues being so positioned as to contact when said lid is on said receptacle; a metallic grip also carried by said wall and adapted to contact with and embrace the carbon of said battery and means for connecting the binding posts of said bell-controlling-mechanism with said tongue and guard carried by said lid.

4. In a combined battery receptacle and bell support, the combination with the receptacle, of a metallic tongue and grip carried by the walls, thereof, a bell support carried by said receptacle, and a bell carried by the support, a metallic guard carried thereby, and a metallic tongue carried by said bell support designed to contact with said tongue carried by said wall, when said support is secured to said receptacle.

In testimony whereof I have signed my name to this specification in the presence of two subscribing witnesses.

JAMES L. KOERBER.

Witnesses:
   J. H. GORMAN,
   JAS. MCAUGHAN.